United States Patent Office 3,649,446
Patented Mar. 14, 1972

3,649,446
METHOD AND APPARATUS FOR PRESSURE CONTROL OF A PAPER MACHINE PRESSURE HEAD BOX
Aarne Olavi Makela, Karhula, Finland, assignor to A. Ahlstrom Osakeyhito, Noormarkku, Finland
Filed Apr. 7, 1969, Ser. No. 814,115
Claims priority, application Finland, Apr. 9, 1968, 991/68
Int. Cl. D21f 1/02
U.S. Cl. 162—212
9 Claims

ABSTRACT OF THE DISCLOSURE

When a change occurs in the pressure of a pressure head box the volume of the head box is varied until the desired pressure is obtained again. The head box includes apparatuses fitted to move in relation to a predetermined 0-position according to changes of pressure in the head box for changing the volume of the head box to constantly maintain the desired pressure in the head box and it is also equipped with a device to return it to its 0-positon all the time maintaining the desired pressure in the head box. The movable portion of the headbox can be a piston-cylinder combination, a movable cover, or simply an elastic vessel.

BACKGROUND OF THE INVENTION

Field of the invention

The present invention relates to a method and an apparatus for controlling the pressure in a paper machine pressure head box, and the object of the invention is to provide a method and an apparatus by means of which the overpressure in the head box can be varied considerably faster than according to conventional techniques.

Paper machine head box pressure control is of considerable importance with respect to the dynamic behavior of the head box, including the strength with which the flow losses of the stock system and the disturbances due to air contained in the stock are felt in the stock flow to the wire. If the head box pressure could be maintained exactly constant, the effect of such disturbances would be negligible. In such a case the dynamic behaviour of a pressure head box would correspond to that of an open head box which notoriously is very advantageous.

Description of the prior art

Pressure control of the air space is normally accomplished by pumping (or in the case of underpressure, by sucking) a predetermined quantity of air per unit time to the head box (a quantity quite often used is e.g. 2.5 kgs./min.). The introduced air leaves the head box through a fixed throttle. The pressure in the air space is measured, and depending upon the measured pressure a pressure controller controls the quantity of the introduced air by closing or opening a control valve in the air feed line so as to obtain the desired pressure. Alternatively the control can be accomplished by introducing a constant quantity of air into the head box per unit time and maintaining the pressure constant by regulating a control valve in the air discharge line. It is further possible to accelerate the pressure control by employing a control valve in both the feed line and the discharge line. These valves will work in opposite directions, so that when, for instance, pressure should be increased, the feed line valve will open the required amount whereas the discharge line valve will simultaneously close approximately an equal amount.

A feature that the above discussed systems have in common is that by means of them it is possible to change the pressure in the air space only slowly, so that, for instance, the sudden disturbances due to stock level variations cannot be adequately compensated. For a normal head box the time factor for air space pressure change is about 60 seconds or more.

SUMMARY OF THE INVENTION

By virtue of the method according to this invention the delay factor can be considerably reduced. The principal characteristics of the method according to the invention are that when a change occurs in the pressure of the pressure head box the volume of the head box is varied until the desired pressure is obtained again.

BRIEF DESCRIPTION OF THE DRAWINGS

The method according to the invention and some embodiments of the apparatus for carrying out the method are described in the following in more detail, with reference to the enclosed schematic drawings, of which the FIGS. 1 to 3 show three embodiments of the apparatus according to the invention only as examples.

DESCRIPTION OF THE PREFERRED EMBODIMENTS

Figure 1:
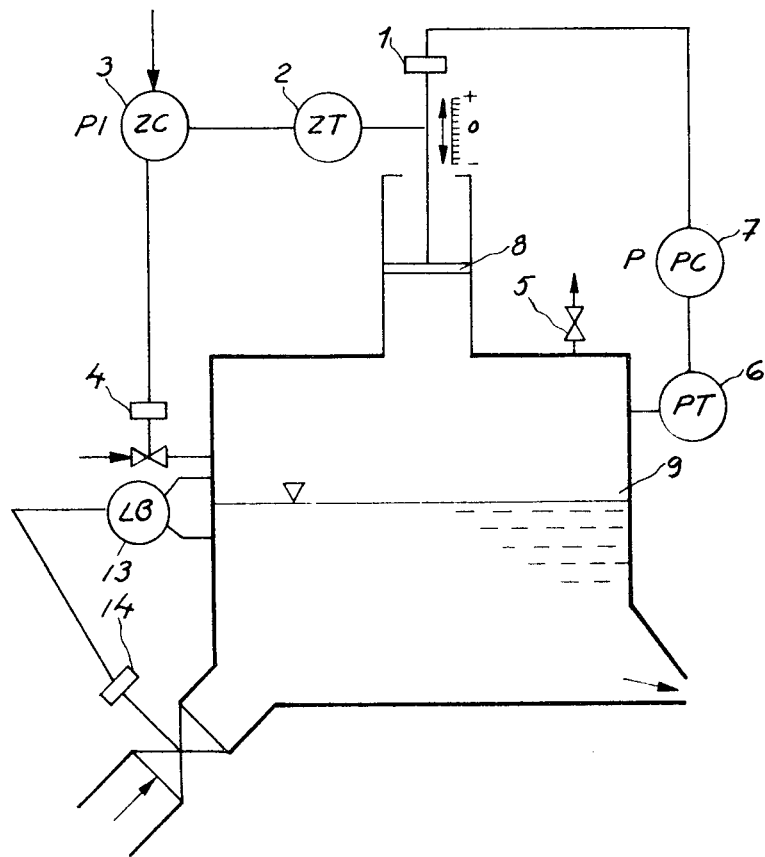

The devices shown in FIG. 1 are the following:

1 Actuating element moving the piston (pneumatic, hydraulic or electric)
2 Measuring transmitter measuring the piston position
3 Controller for the piston position control system
4 Actuating element for the feed air control valve
5 Discharge air throttle (fixed position)
6 Pressure transmitter measuring the pressure in the air space
7 Pressure controller
8 Piston
9 Head box
13 Controller for the head box liquid level
14 Stock flow control valve The pressure transmitter 6 will measure the pressure in the air space and transmit the information to the pressure controller 7, which will compare the signal with the predetermined value, and, if there is a deviation between them, it will make the actuating element (the actuating element may be a pneumatic or hydraulic cylinder or an electric motor that moves the piston visible in the picture by means of the transmission) move the piston 8 in such a direction that the desired pressure is obtained by means of a change in the volume.

The system is very fast because the pressure transmitter 6 and the controller 7 may be electronic devices, in which case the delay is non-existent. Thus, the actuating element 1 will begin to move the piston 8 practically without delay and the change in the volume will proportionally change the pressure in the head box 9 without delay.

In addition the system includes a simple position control system which functions to insure that, when stationary, the piston 8 will stay in the central position to enable it to move in either direction when needed. The position control system 2, 3 will measure the position of the piston 8 and regulate the feed air control valve 4 in accordance with its movement so that the piston will return to its central position. This control system may be slow for it is not designed to participate in actual pressure control.

At this speed, the following advantages will be gained with the pressure control system:

(1) The dynamic behavior of the head box is comparable to the very advantageous behavior of an open head box in regard to the elimination of disturbances. Further, any desired changes in the total pressure (the pressure of the air space+the hydrostatic pressure of the stock) can be obtained rapidly by regulating the predetermined value of the pressure control circuit. Because the dynamics of the head box will thus be made more advantageous, the discharge flow from the head box to the wire can be kept more constant and the result will be an even quality of paper.

(2) The quantity of air to be pumped into the head box can be reduced. The air space of the head box can be decreased faster because of the control. The construction costs of the head box can consequently be decreased.

What has been said above regarding the control of a head box with overpressure can be applied as such to a head box with underpressure.

Figure 2:
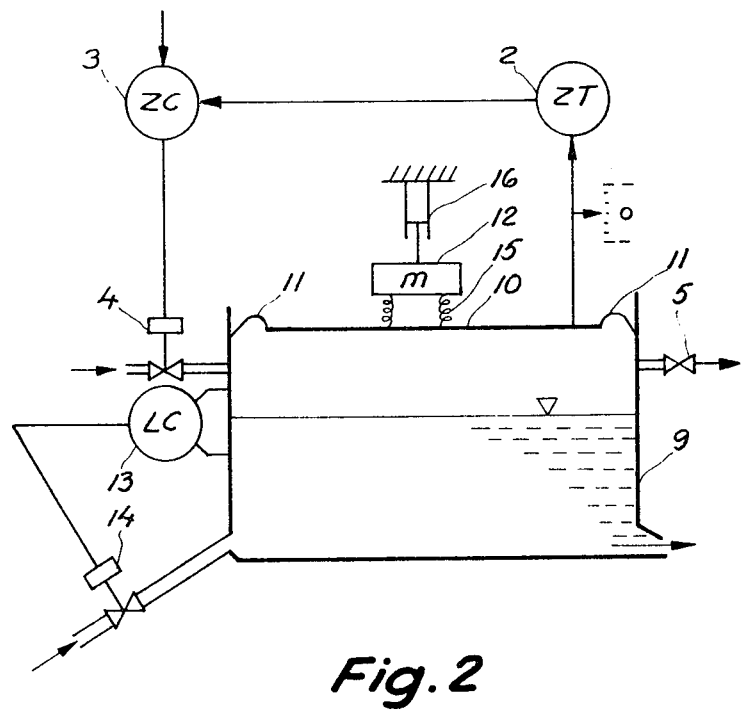

FIG. 2 illustrates the structural principles of a head box with a very small volume of air and the control circuits it demands.

The cover of the head box 9 is made of elastic material (for instance, rubber). The cover is reinforced with a stiff (metal) plate 10 so that the rubber will remain elastic only on the sides 11. Thus, the cover will be able to move freely in a vertical direction (about ±3 cm. is perhaps a suitable leeway for the movement). The pressure in the head box will be created by placing weights 12 on the cover until the desired overpressure is obtained (=weight divided by the area of the cover). The liquid level is kept constant by means of a standard level control circuit that regulates the stock valve 14. Compressed air is introduced to the air space through the control valve 4. The control valve is regulated by the position controller 3, which will return the cover to its central position. This control circuit may be slow. The cover will follow any variations in the liquid level caused by disturbances and the total pressure will change only by the amount corresponding to a change in the liquid level.

The following devices are shown in FIG. 2:

9   Head box
10  The part of the head box cover stiffened with a metal plate
11  The part of the head box cover to be left elastic
12  Weight to be placed on the cover
2   Measuring transmitter measuring the cover position
3   Controller for the cover position control circuit
4   Air flow control valve
13  Controller for the head box liquid level
14  Stock flow control valve
5   Throttle through which air is discharged
15  Springs            ⎱ to eliminate the effects of the stock
16  Shock absorber     ⎰ at great speeds of change The following are some advantages that can be gained with the system described:

(a) Its shock absorbtion is comparable to that of an open head box, which is known to be advantageous in this respect.

(b) The air space can be made very small with the result that the head box will be smaller and less expensive.

(c) The amount of air to be pumped into the air space can be kept very small with the result that the consumption of compressed air will remain insignificant.

The head box structure described above is as such applicable to underpressures as well. In this case the cover must naturally be raised. This takes place simply by means of a counterweight and an ordinary pulley wheel.

Figure 3:
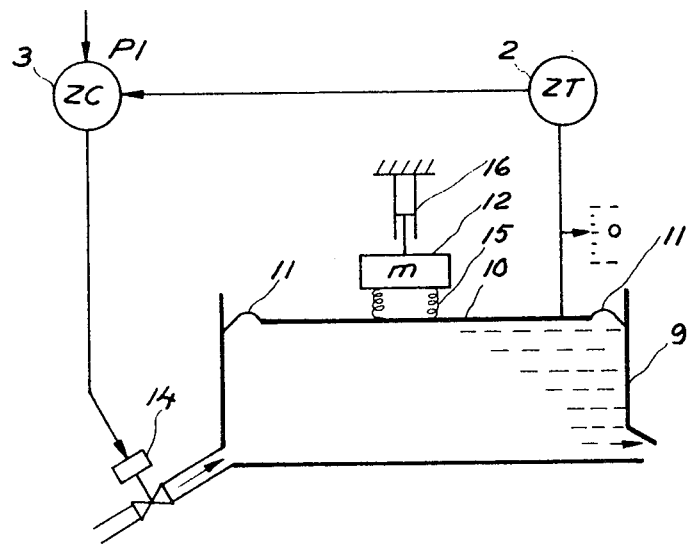

FIG. 3 shows the structure of a head box working without an air cushion and the control circuit it requires. It differs from the system presented in FIG. 2 only in the respect that the air space has been entirely omitted. The advantage of this head box 9 over the head boxes shown in FIGS. 1 and 2 is that, owing to the lack of air space, no air need be pumped into the head box and, consequently, one control circuit can be entirely left out. The control circuit for the cover position directly regulates the stock control valve.

The following devices are shown in FIG. 3:

9   Head box
10  The part of the head box cover stiffened with a metal plate
11  The part of the head box cover to be left elastic
12  Weight to be placed on the cover
2   Measuring transmitter measuring the cover position
3   Controller for the cover position control circuit
14  Stock flow control valve
15  Springs            ⎱ to eliminate the effects of the stock
16  Shock absorber     ⎰ at great speeds of change In the systems presented in FIGS 2 and 3 the weights can naturally be placed partly or entirely by a force maintained constant. In this case a separate control circuit is required to regulate the force. In this way the shock absorbtion ability of the head box can be further improved (in practice, however, this will hardly be necessary).

The weight to be placed on the cover can be varied conveniently, for instance, the weight is formed by liquid in a vessel. It is simple to increase or decrease the amount of liquid.

The novel contributions described above need not be limited in application to the head box of a paper machine only, but they can be used to level the pressure in other similar applications as well.

The invention is not limited to the devices described and illustrated schematically above and applicable to the realization of the process, but the devices can be varied in multiple ways within the spirit and scope of the invention. Hence, when necessary, the cylinder and the piston can also be placed outside the head box and connected with the air space of the head box with a large pipe. Further, the change of volume can be obtained by pressing some elastic vessel (for instance, bellows) together and respectively by letting it expand.

One very simple way of constructing a pressure control system based on the variation of the volume of the air space of the head box in accordance with the invention is to place bellows (or a cylinder), the volume of which is varied, into the air space of the head box. In this case the volume of the bellows (or cylinder) and consequently that of the air space as well can be varied simply and rapidly by means of highly-compressed air (perhaps some 10 kp./cm.$^2$) and magnetic valves.

I claim:

1. Pressure head box of a paper machine including means for infeed and outfeed of pulp, means for pressurizing the head box comprising volume adjusting means fitted to move with respect to a predetermined O-position for changing the volume of the head box in response to changes of the pressure in the head box to constantly maintain the desired pressure in the head box and means to return the volume adjusting means to its O-position while constantly maintaining the desired pressure in the head box.

2. Pressure head box as claimed in claim 1, including a pressure transmitter installed in operative connection with the interior of the head box for sensing any change of pressure, and a pressure controller coupled with said transmitter for changing the volume of the head box in response to such signals by actuating moving elements to restore the desired pressure.

3. Pressure head box according to claim 2, wherein the elements causing the changes in volume of the head box include a piston-cylinder combination installed in connection with the head box.

4. Pressure head box according to claim 2, wherein the elements causing changes in the volume of the head box include a vessel made of elastic material installed in connection with the head box.

5. Pressure head box according to claim 3, including means for returning the piston to a central position within the cylinder after a change of volume has taken place.

6. Pressure head box according to claim 4, including means for returning the elastic vessel to its normal contour after a change of volume has taken place.

7. Pressure head box according to claim 1, wherein a sealingly secured cover of the head box is fitted for motion in a vertical direction between side walls of the head box, said cover being equipped with an adjustable weight corresponding to the pressure prevailing in the head box.

8. Pressure head box according to claim 7, wherein the adjustable weight on the cover of the head box is provided with shock absorbers.

9. Method for pressure control of a paper machine pressure head box comprising changing the volume of the head box in response to pressure changes in the head box to restore a desired pressure in the head box and subsequently changing the volume of the head box to a normal value while constantly keeping the desired pressure in the head box.

References Cited
UNITED STATES PATENTS

| 3,313,681 | 4/1967 | Dennis | 162—336 |
| 2,901,040 | 8/1959 | Gade | 162—259 |

REUBEN FRIEDMAN, Primary Examiner

R. H. ANDERSON, Assistant Examiner

U.S. Cl. X.R.

137—157, 206; 162—259, 339, 340, 341

PO-1050
(5/69)

UNITED STATES PATENT OFFICE
CERTIFICATE OF CORRECTION

Patent No. 3,649,446    Dated March 14, 1972

Inventor(s) Aarne Olavi Makela

It is certified that error appears in the above-identified patent and that said Letters Patent are hereby corrected as shown below:

The correct spelling of the Assignee is A. Ahlstrom Osakeyhtio

Signed and sealed this 22nd day of August 1972.

(SEAL)
Attest:

EDWARD M. FLETCHER, JR.
Attesting Officer

ROBERT GOTTSCHALK
Commissioner of Patents